United States Patent Office 2,872,752
Patented Feb. 10, 1959

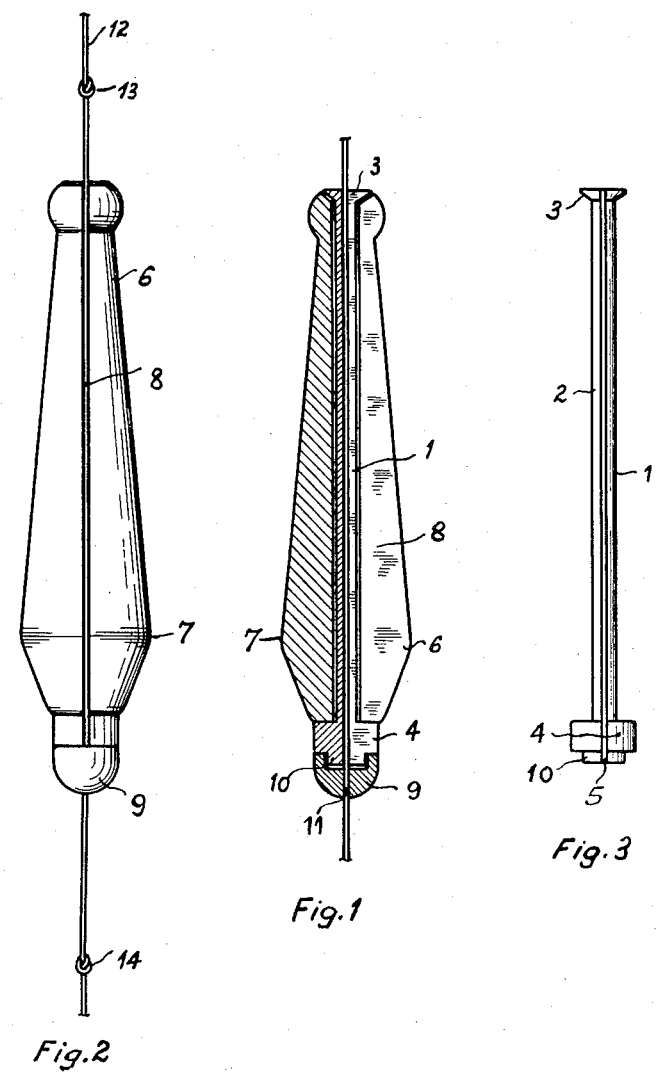

2,872,752

FISHING-LINE LEADING BOB

Karl Salzmann, Winterthur, Switzerland

Application May 8, 1956, Serial No. 583,448

Claims priority, application Switzerland May 10, 1955

1 Claim. (Cl. 43—44.9)

My present invention relates to improvements in leading bobs for fishing purposes, which may be used both in still and in running water.

Known bobs for fishing purposes comprise an indicating member which by means of a center piece may be withdrawn from the bob. The disadvantage of such known construction is the risk, when casting, of fouling bait and line or of wedging the center piece at the upper end of the bob.

The main purpose of my present invention is the elimination of said disadvantages. Accordingly, the leading bob disclosed by my present invention is characterized by an indicating member which is integral with the bob.

One embodiment of the invention is shown, by way of example, in the accompanying drawing, in which:

Fig. 1 shows the bob in axial section,
Fig. 2 illustrates the same in elevation, and
Fig. 3 is a side view of a detail.

The bob comprises a bar 1, for example of metal, which is provided with a longitudinal groove 2 extending over the entire length of the bar up to the middle thereof. One end of bar 1 is conically enlarged at 3, and the other bar end carries a slotted ring 4, slot 5 registering with groove 2.

Furthermore, a body 6 is provided which surrounds bar 1 from ring 4 up to the conical enlargement 3, bar 1 being rotatable in body 6. The latter, the upper conically enlarged portion of which serves as indicating member, consists of plastic and is formed as a body of rotation the diameter of which gradually decreases to both ends. The maximum diameter of body 6 is a plane at 7 in the vicinity of ring 4. Body 6 also is provided with a longitudinal slot 8 which extends through the entire length of body 6 down to the hollow space in which bar 1 is accommodated. The arrangement is such that through rotation of bar 1 in body 6 with the aid of ring 4 groove 2 is registerable with slot 8.

On that extruding portion 10 of bar 1 which extends beyond ring 4, a cap 9 is loosely mounted. Cap 9 is made of a material which is substantially heavier than that of the other portions of the bob, for example lead, and is provided with a central bore 11.

A line 12 is trained through the registering slots 8, 5 and groove 2 in bar 1. For securing said line in bar 1, the latter is so rotated with respect to body 6 that slot 8 of body 6 and groove 2 of bar 1 no longer register with each other. Line 12 is provided with limit knots 13 and 14 between which line 12 is slidable in groove 2.

On casting the bob, the indicating member thereof floats on the water, while cap 9 sinks and slides on line 12 down to knot 14 and then causing line 12 to slide until knot 13 abuts against the conical enlargement 3. Cap 9 is of a construction to ensure a faultless sure-aimed cast and the vertical position of the bob.

The bob described above may be used in still water as a running bob.

What I claim is:

In a fishing tacke and in combination with the fishing line, the improved line-leading bob comprises a longitudinally slotted conically tapered body, said body having at its smaller end an enlarged indicating portion destined to project above the water level, a metal bar rotatably accommodated in said slotted body and provided with a longitudinal groove, said bar at its end situated in said enlarged body portion being conically enlarged to afford a seat therein and said bar near its other end carrying a slotted ring, and a centrally bored cap loosely mounted on said other bar end and said ring, and slidable on said line, said line passing through the bar groove and the ring and the cap, and the arrangement being such that said line is introduceable into the detached bob through the registering slots in said body and ring and bar and lockable in said bob by rotating said bar relatively to said body by means of said ring to bring said slots out of register.

References Cited in the file of this patent

UNITED STATES PATENTS

| | | |
|---|---|---|
| 1,243,768 | Scott | Oct. 23, 1917 |
| 1,802,260 | Kopsho | Apr. 21, 1931 |
| 2,106,618 | Mehaffey | Jan. 25, 1938 |
| 2,315,048 | Croft | Mar. 30, 1943 |
| 2,792,665 | Brickler | May 21, 1957 |